US006317778B1

(12) United States Patent
Dias et al.

(10) Patent No.: US 6,317,778 B1
(45) Date of Patent: Nov. 13, 2001

(54) SYSTEM AND METHOD FOR REPLACEMENT AND DUPLICATION OF OBJECTS IN A CACHE

(75) Inventors: Daniel Manuel Dias, Mahopac; Arun Kwangil Iyengar, Yorktown Heights, both of NY (US); Eric Michel Levy-Abegnoll, Nice (FR); Junehwa Song, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/197,626

(22) Filed: Nov. 23, 1998

(51) Int. Cl.[7] .................................................. G06F 13/00
(52) U.S. Cl. ........................ 709/214; 709/105; 711/133; 711/159
(58) Field of Search ................................... 709/102, 104, 709/105, 214, 223, 226; 711/122, 133, 147, 159

(56) References Cited

U.S. PATENT DOCUMENTS

| | | |
|---|---|---|
| 4,503,501 | 3/1985 | Coulson et al. . |
| 5,732,240 * | 3/1998 | Caccavale ............................ 711/118 |
| 5,809,250 | 9/1998 | Kisor . |
| 5,842,216 | 11/1998 | Anderson et al. . |
| 5,893,149 * | 4/1999 | Hagersten et al. .................... 711/135 |
| 6,012,126 * | 1/2000 | Aggarwal et al. .................... 711/133 |
| 6,105,033 * | 8/2000 | Levine ................................. 707/101 |
| 6,167,438 * | 12/2000 | Yates et al. .......................... 709/216 |

OTHER PUBLICATIONS

Vivek S. Pai et al., "Locality–Aware Request Distribution in Cluster–based Network Servers", Proceedings of the Eighth International Conference on Architectural Support for Programming Languages and Operating Systems (ASPLOS–VIII), San Jose, CA, 10/98, pp. 1–12.

Daniel M. Dias et al., "A Scalable and Highly Available Web Server", Proceedings of Complon '96, 8 pages.

Guerney D. H. Hunt et al., "Network Dispatcher: a connection router for scalable Internet services", Seventh International World Wide Web Conference, 4/98, 16 pages.

Pei Cao et al., "Cost–Aware WWW Proxy Caching Algorithms", Usenix Symposium on Internet Technologies and Systems, 12/97, pp. 193–206.

J. Mogul et al., "Hypertext Transfer Protocol—HTTP/1.1", 1/97, pp. 1–159.

Nancy J. Yeager et al., "Web Server Technology", The Advanced Guide for World Wide Web Information Providers, 1996, 4 pages.

Marc Abrams et al., "Caching Proxies—Limitations and Potentials", Fourth International World Wide Web Conference Proceedings, 10/95, pp. 119–133.

Timos K. Sellist, "Intelligent Caching and Indexing Techniques for Relational Database Systems", Inform. Systems, vol. 13, No. 2, 1988, pp. 175–185.

Eric Levy et al., "Design and Performance of a Web Server Accelerator", IBM Research RC 21242 (94826), published 7/98 by the IBM Research Division, pp. 1–20.

* cited by examiner

*Primary Examiner*—Viet D. Vu
(74) *Attorney, Agent, or Firm*—Gail H. Zarick; Anne Vachon Dougherty

(57) ABSTRACT

Objects are cached in a system adapted to receive requests for said objects from one or more clients. The system has at least one of a plurality of nodes. Each node of the plurality of nodes includes at least one of a plurality of caches. One or more performance criteria of the system are selected. At least one of a plurality of metrics is assigned to a selected performance criterion. The desirability of storing an object of the objects in any one of the plurality of caches is calculated by assigning at least one of a plurality of desirability values to at least one of the objects based on the at least one of the plurality metrics. Any one of the objects stored in the at least one of the plurality of caches is replaced based on the at least one of the plurality of desirability values.

27 Claims, 7 Drawing Sheets

SYSTEM AND METHOD FOR REPLACEMENT AND DUPLICATION OF OBJECTS IN A CACHE

FIELD OF THE INVENTION

The present invention relates in general to a caching system. In particular, the present invention relates to replacement and duplication of objects in a cache. Furthermore, the present invention relates to replacing and duplicating objects in a cache array having multiple cache nodes using a variety of cache replacement policies in a system having multiple potential bottlenecks.

BACKGROUND OF THE INVENTION

Caching is commonly used for improving performance on computer systems. Once an object is stored in a cache, subsequent requests for the cached object may be satisfied by the cache. Satisfying requests for an object from a cache may incur less overhead than regenerating or retrieving the object from a remote location. Slow performance coupled with a growing demand for Web services, may cause Web servers to become inefficient or unusable.

Caching offers a methodology for dealing with growing demands for greater throughput for Web and Proxy servers. Systems of clients and servers on the World Wide Web, for example, may use caching to improve performance. In some instances, Web server applications may perform slowly and inefficiently without the benefit of a cache. Without the benefit of a caching scheme, Web servers may become a system bottleneck. The underlying operating system running on a Web server, for example, may have performance problems impeding the throughput of the Web server. One technique for improving the performance of Web servers is to store frequently requested data (e.g. Web pages) in a cache. Retrieving data from the cache may require less overhead than retrieving the data from the Web server.

SUMMARY OF THE INVENTION

Objects are cached in a system adapted to receive requests for said objects from one or more clients. The system has at least one of a plurality of nodes. Each node of the plurality of nodes includes at least one of a plurality of caches. More than one performance criterion of the system are selected. At least one of a plurality of metrics is assigned to the selected performance criteria. The desirability of storing an object of the objects in any one of the plurality of caches is calculated by assigning at least one of a plurality of desirability values to at least one of said objects based on said at least one of the plurality metrics. Any one of the objects stored in the at least one of the plurality of caches is replaced based on the at least one of the plurality of desirability values.

BRIEF DESCRIPTION OF THE DRAWINGS

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included are the following figures.

DETAILED DESCRIPTION OF THE INVENTION

Glossary of Terms

Figure 1A:
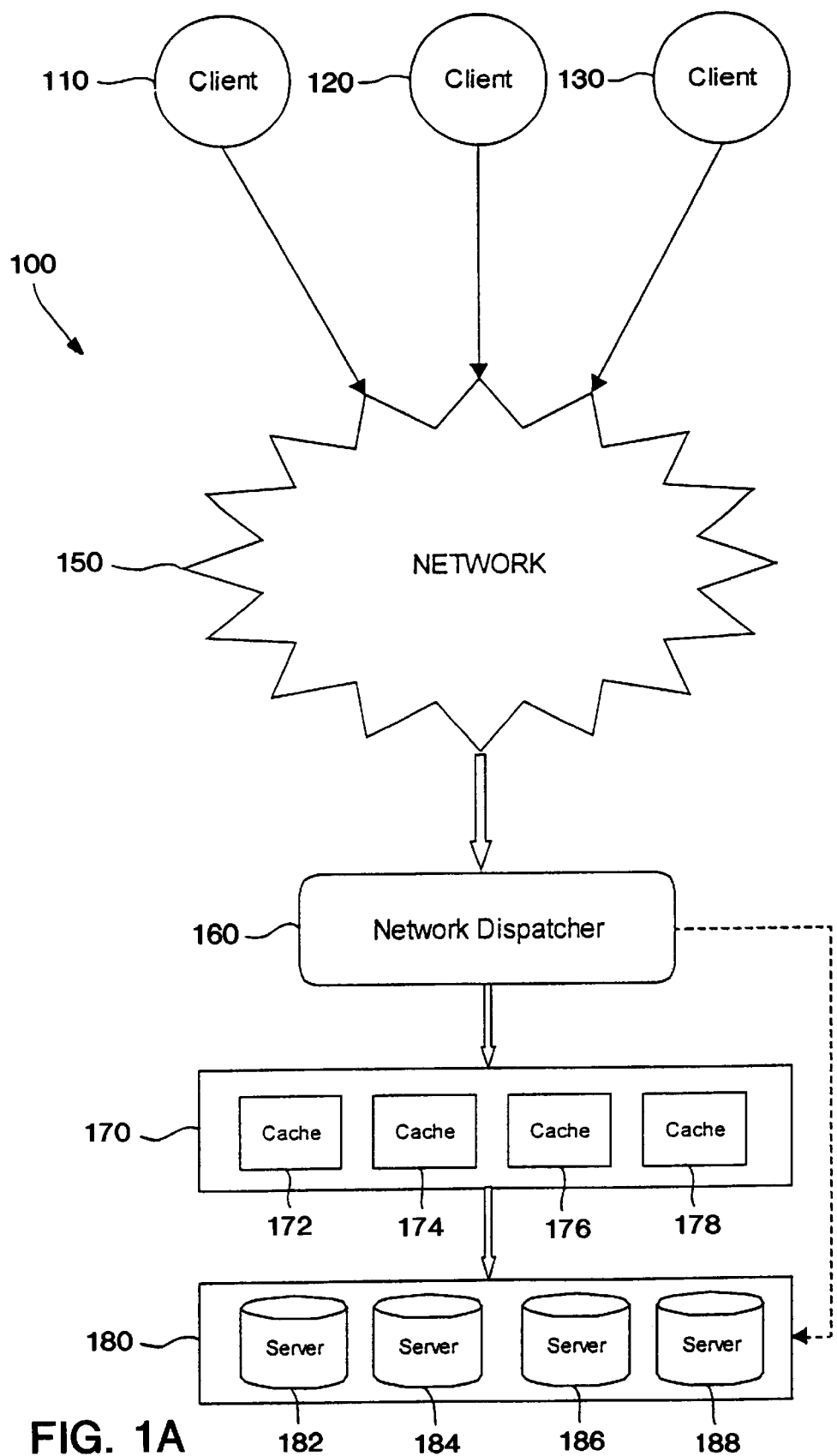
FIG. 1(a) is a block diagram of a computer network system in accordance with an exemplary embodiment of the present invention.

While dictionary meanings are also implied by terms used herein, the following definitions may also be helpful.

Client

A client computer which typically issues commands and/or requests to one or more servers which perform the task associated with the command and/or request.

Server

A server is a computer which performs a task at the command and/or request of one or more client computers.

World Wide Web (Web)

An Internet service that links documents by providing hyperlinks from server to server. Users may "jump" from document to document by clicking on highlighted words or phrases of interest (hypertext links), click on graphics such as applets or image maps, fill in forms, and enter URLs. User's may "jump" from document to document no matter where the documents are stored on the Internet. Internet Web servers support clients and provide information. Users "browse the Web" using Web client programs. The web may be considered as the Internet with resources addressed by URLs using HTTP protocols to transfer information between computers. HTML (among other formats) may be used to display information corresponding to URLs and provide point-and-click interface to other URLs.

Universal Resource Locator (URL)

An address for a resource on the Internet. URLs are used by Web browsers to locate Internet resources. A URL specifies the protocol to be used in accessing the resource (such as http: for a World Wide Web page or ftp: for an FTP site), the name of the server on which the resource resides (such as //www.whitehouse.gov), and, optionally, the path to a resource (such as an HTML document or a file on that server).

HyperText Markup Language (HTML)

The markup language used for documents on the World Wide Web. HTML is an application of SGML (Standard Generalized Markup Language) that uses tags to mark elements, such as text and graphics, in a document to indicate how Web browsers should display these elements to the user and should respond to user actions such as activation of a link by means of a key press or mouse click. HTML is a device-independent representation of content on Web servers. Web servers may deliver content (including hyperlinks) to clients in HTML with confidence that the client will choose an appropriate presentation.

User Datagram Protocol (UDP)

A connectionless protocol within TCP/IP that corresponds to the transport layer in the ISO/OSI model. UDP converts data messages generated by an application into packets to be sent via IP but may not verify that messages have been delivered correctly. Therefore, UDP may be more efficient than TCP, so it may be used for various purposes, including SNMP (Simple Network Management Protocol); the reliability may depend on the application that generates the message.

Router

An intermediary device on a communications network that expedites message delivery. On a single network linking many computers through a mesh of possible connections, a router receives transmitted messages and forwards them to their correct destinations over the most efficient available route. On an interconnected set of local area networks (LANs) using the same communications protocols, a router serves the somewhat different function of acting as a link between LANs, enabling messages to be sent from one to another.

Web Browser

A client application that enables a user to view HTML (or other) documents on the World Wide Web, another network, or the user's computer; follow the hyperlinks among them; and transfer files.

Transmission Control Protocol (TCP)

The protocol within TCP/IP that governs the breakup of data messages into packets to be sent via IP, and the reassembly and verification of the complete messages from packets received by IP. TCP corresponds to the transport layer in the ISO/OSI model.

Cache

A special memory subsystem in which frequently used data values are duplicated for quick access.

Object

An object is data that may be stored in a cache, server, or client.

Hit

A successful retrieval of data from a cache rather than from the slower hard disk or RAM.

Update

To change an object to make it more current.

FIG. 1(a) illustrates an exemplary computer network system including: Clients 110, 120, and 130, network 150, network dispatcher 160, cache array 170, and server cluster 180 (See U.S. Patent Application filed Nov. 20, 1998, titled "Scalable Cache", by Daniel M. Dias, Arun Kwangil Iyengar, Eric M. Levy-Abegnoli, and Junehwa Song incorporated by reference herein in its entirety). Cache array 170 includes cache nodes (cache members) 172, 174, 176, and 178. Server cluster 180 includes servers ("back-end" servers) 182, 184, 186, and 188. Client computers 110, 120, and 130 issue requests for objects such as, for example, Web pages. Note that network dispatcher 160 and/or cache nodes 172, 174, 176, and 178, may be implemented by one or more routers. For example, IBM 2216 routers may be used. Note that in a system having a plurality of nodes, cache nodes or cache members of a cache array may be referred to as level one nodes whereas ("back-end") servers may be referred to as level two nodes.

Figure 1B:
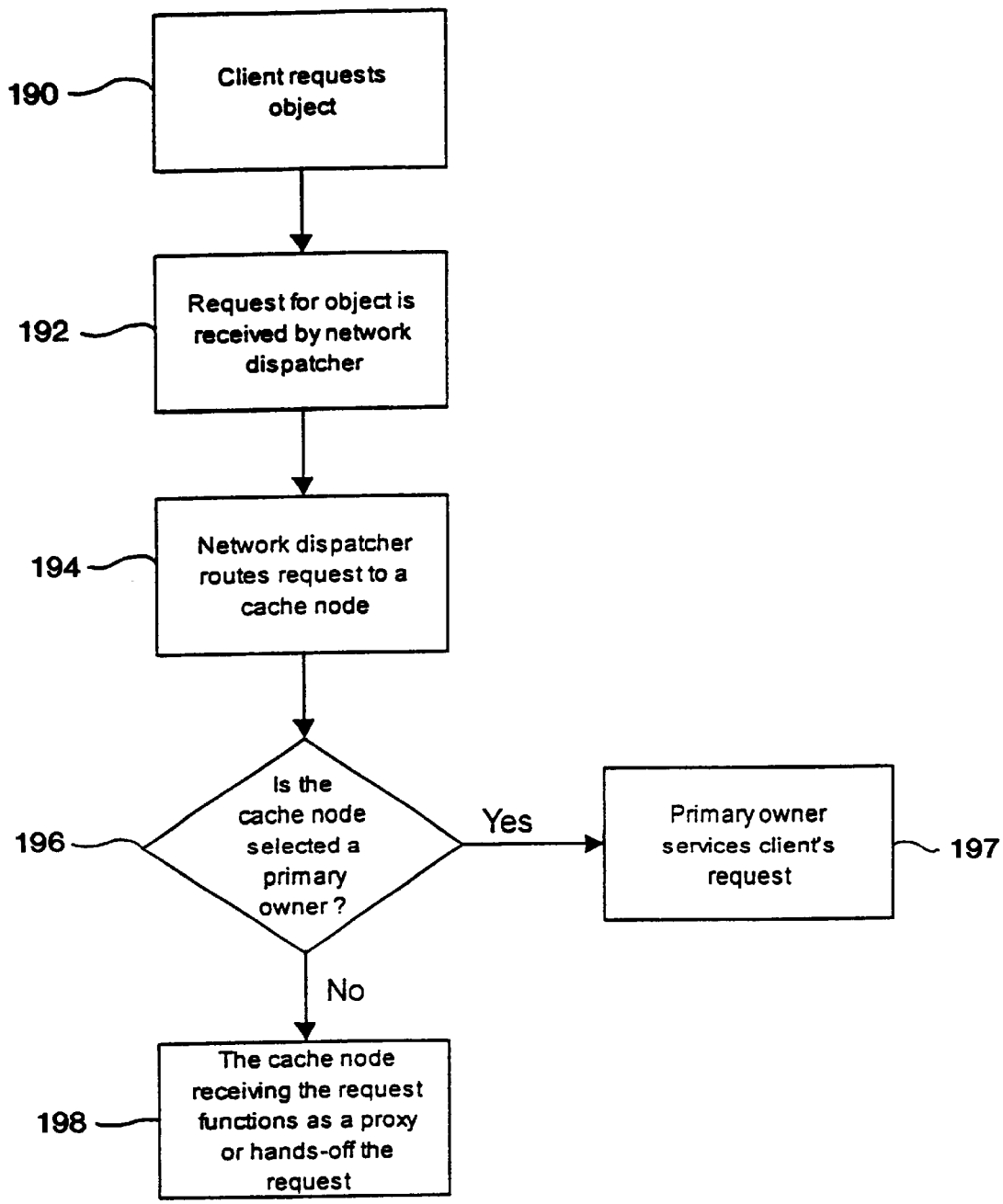
FIG. 1(b) is a flowchart diagram of a method for retrieving a requested object in accordance with an exemplary embodiment of the present invention.

FIG. 1(b) is a flowchart diagram of a method for retrieving a requested object in accordance with an exemplary embodiment of the present invention (See U.S. Patent Application filed Nov. 20, 1998, titled "Scalable Cache", by Daniel M. Dias, Arun Kwangil Iyengar, Eric M. Levy-Abegnoli, and Junehwa Song). In step 190 a client, for example client 110, requests an object which may be stored (or generated or fetched by) a server, for example server 182. In step 192 the request for an object is received via a network, for example network 150, by a network dispatcher, for example network dispatcher 160. In step 194 network dispatcher 160 routes the request for the object to one cache node, for example cache node 172. Optionally, network dispatcher 160 may route a request directly to a server, for example, server 182. In other words, network dispatcher 160 may bypass cache array 170. In step 196 a determination is made whether cache node 172 receiving the request for the object from network dispatcher 160 in step 194, is a primary owner of the object. If cache node 172, receiving the request for the object from network dispatcher 160 in step 194, is a primary owner (cache node hit), then cache node 172 may service the client's request in step 197. Otherwise (cache node miss), in step 198 cache node 172 and a primary owner may either function as a proxy (e.g. through an HTTP or a UDP interface) to service the request and retrieve the requested object or cache node 172 may handoff the request to the primary owner. In steps 197 and 198 primary owner retrieves the requested object either from cache memory (cache array hit) or by communicating with server 182 (cache array miss). Note that one of ordinary skill in the art may modify the invention such that more than one cache node may be a primary owner of an object.

It may be advantageous to replace some less frequently requested objects stored in a cache or in a cache node of a cache array with more frequently requested (or "hot") objects. It may also be advantageous to duplicate (i.e. make new copies of) objects already stored in one cache member in another cache member of a cache array. Replacement and/or duplication of objects in cache members of a cache array may lead to better system throughput. Additionally, replacement and/or duplication of objects in a cache member of a cache array may help to reduce the number of cache member misses and/or prevent poor system performance in case of cache node failure.

System throughput may be improved, for example, by maintaining more than one copy of an object, with each copy in a different cache member. One or more copies of an object may also be maintained on several cache nodes (cache members). In this way, relatively high availability may be provided to cached objects. Further, if one cache or cache node containing a copy of an object fails then another cache or cache node containing a duplicate copy of the object may still serve requests for the object. If, for example, there is sufficient space in a cache (or cache node) it may be possible to store more than one copy of "hot" objects. If sufficient space, however, is not available to store a new copy of a "hot" object (or a "hot" object which has not yet been cached), it may be desirable to remove and replace objects stored in the cache with the "hot" object.

Replacement and/or duplication of objects in a cache or in a cache node of a cache array may be helpful in maximizing the performance of the system by minimizing demands on system resources. Desired system performance may be adjusted by selecting an appropriate performance criterion. Metrics may be chosen to measure system performance corresponding to the selected performance criterion. For example, a first metric may measure utilization of server resources, a second metric may measure utilization of cache array (or cache) resources, while a third metric may measure network I/O (Input/Output) between a cache array (or cache) and a server cluster. A metric may be implemented, for example, by calculating a mathematical function or by identifying a location in a data structure (e.g. a position in a linked list).

Based on a chosen metric, measuring system performance, scores or desirability values may be calculated and assigned to objects. Desirability values may provide an evaluation (or an estimate) of improved system performance resulting from replacement and/or duplication of an object in a cache. When the utilization of a system resource becomes a bottleneck, the desirability value calculated and assigned to objects based on a metric corresponding to the bottleneck resource may be used to guide object replacement and/or duplication. For example, consider a case where desirability values are calculated and assigned to objects based on a metric measuring utilization of server resources. In this case, a relatively low desirability value assigned to an object may indicate that replacement of the object, in a cache, with another object having a higher desirability value may lower the utilization of server resources. Thus, using desirability values as an indication of improved system performance resulting from replacement and/or duplication of an object in a cache may be used to (dynamically) adjust and improve system performance.

Figure 2:
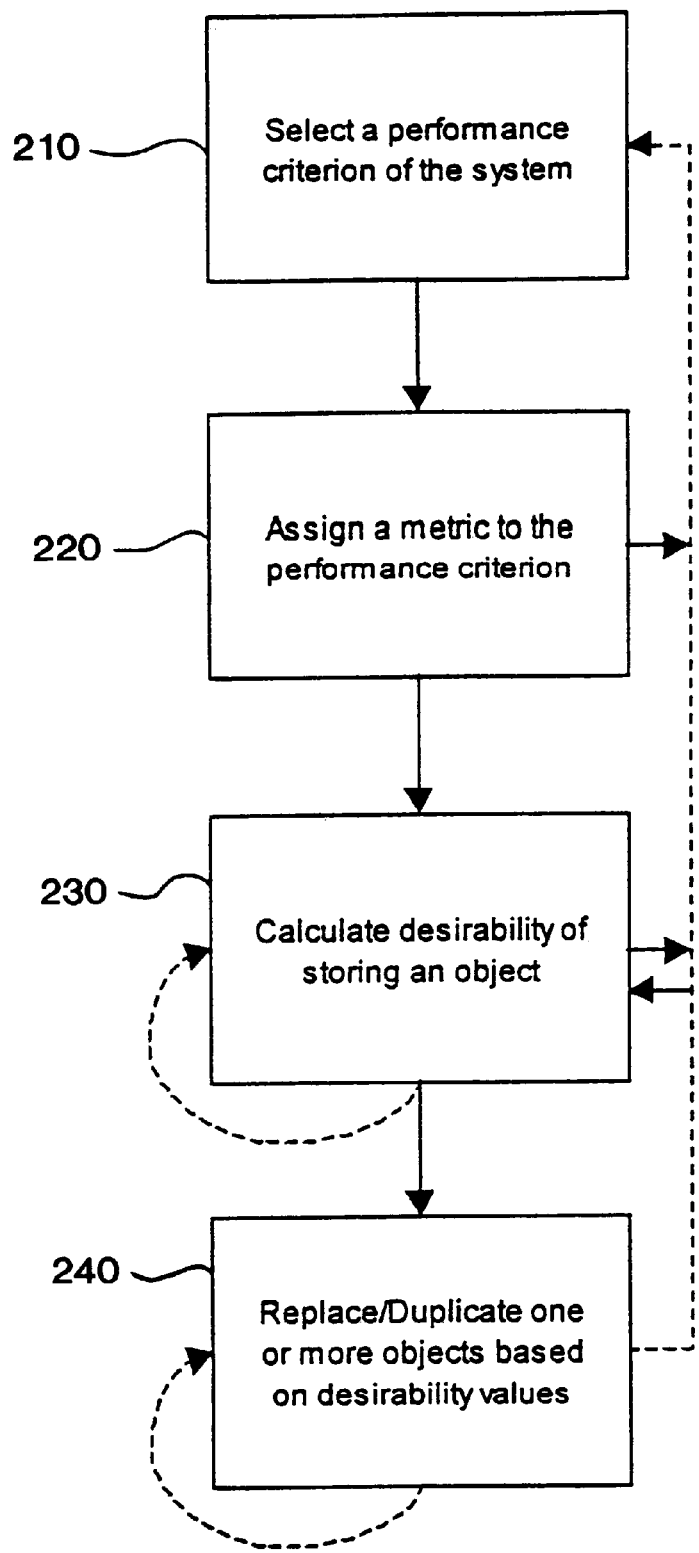
FIG. 2 is a flowchart diagram of a method for replacing or duplicating objects in a cache in accordance with an exemplary embodiment of the present invention.

FIG. 2 is a flowchart diagram of a method for replacing or duplicating objects in a cache in accordance with an exemplary embodiment of the present invention. In step 210 a performance criterion of the system may be selected. For example, a performance criterion may be associated with one or more of: utilization of server resources, utilization of cache array (or cache) resources, and network I/O between a cache array (or cache) and a server cluster.

In step 220 a metric is assigned or chosen for a performance criterion. For example, suppose that bottlenecks are caused in the system due to the performance of servers. The desirability for storing in a cache (caching) an object may be associated with an amount of server CPU time saved by caching a copy of the object, normalized (divided by) the size of the object. Let o represent a given object. The desirability of caching a first copy of object o may be proportional to an expected number of hits to object o per unit time (assuming it is cached) multiplied by an expected server processing time (to fetch or generate object o) and divided by the size of object o. An exemplary function for estimating the desirability of caching one copy of object o is:

$$d1(o,1)=(t/a-t*p/u)/s \qquad (1)$$

where a is an expected time between successive requests for object o, t represents an expected server processing time to fetch or generate object o, u represents an expected time between successive updates of object o, p represents a probability that object o may be accessed between successive updates to object o, and s represents the size of object o. Other functions may also be used for estimating the desirability of caching object o. If at least one copy of object o is already cached, no additional server resources may be saved by caching additional copies of object o. Therefore, the desirability for caching any additional copies of object o, in this case, may be given by:

$$d1(o,i)=0, \forall i>1. \qquad (2)$$

Alternatively, suppose that bottlenecks are caused in the system due to the performance of a cache array. Let n be the number of caches in a cache array. Assume, for example, that on average, 1/n requests are received by a cache node is which is a primary owner of the requested object (cache node hit). If the requested object has not been stored in any cache node of a cache array (cache array miss), an expected cache array processing time to satisfy a request for an object may be given by:

$$\text{miss\_time}=a_1/n+b*(n-1)/n \qquad (3)$$

where $a_1$ represents an expected time to satisfy a request for the case of a cache node hit, and b represents an expected time to satisfy a request for the case of a cache node miss.

If, on the other hand, a copy of the requested object has already been stored in some cache node (cache array hit), an expected cache array processing time to satisfy a request for an object may be given by:

$$\text{hit\_time}(1)=c/n+d*(n-1)/n \qquad (4)$$

where c represents an expected processing time to retrieve a requested object from a cache array in the case of a cache node hit, and d represents an expected time to retrieve a requested object from a cache array in the case of a cache node miss. Note that the variables $a_1$, a, b, c, and d, may each either be a constant, a function of the size of an object (i.e. $a_1=a_1(\text{size}(o))$, $a=a(\text{size}(o))$, $b=b(\text{size}(o))$, $c=c(\text{size}(o))$, $d=d(\text{size}(o))$ for an object o), or, in general, a function of objects (i.e. $a_1=a_1(o)$, $a=a(o)$, $b=b(o)$, $c=c(o)$, $d=d(o)$ for an object o). Note further that variables (or functions) $a_1$, b, c, d, t, miss_time, and hit_ time may be determined, for example, by conducting empirical measurements of system behavior for different objects. Variables (or functions) p, u, and a may be determined, for example, as set forth in U.S. patent application Ser. No. 08/958,506 titled "A New Algorithm for Cache Replacement" incorporated by reference herein in its entirety.

Expected savings in cache array processing time for the case of a cache array hit may thus be given by:

$$\text{savings}(1)=\text{miss\_time}-\text{hit\_time}(1) \qquad (5)$$

Further, the desirability of caching a single copy of an object o may be proportional to an expected number of hits to object o per unit time (assuming it is cached) multiplied by a measure of savings (resulting from caching object o) and divided by the size of object o. An exemplary function for estimating the desirability of caching a first copy of object o is:

$$d2(o,1)=(1/a-p/u)*\text{savings}(1)/s \qquad (6)$$

Other functions may also be used for estimating the desirability of caching object o.

If at least one copy of object o is already cached, say in i cache nodes, where 0<i<n, then copying object o to another cache node (which does not already contain a copy of object o) may reduce the number of cache node misses for object o. Thus, overhead associated with retrieving (fetching) object o from a cache array may be reduced.

If object o is contained in i cache nodes, an expected cache array processing time to satisfy a request for object o may be given by:

$$\text{hit\_time}(i)=c*i/n+d*(n-i)/n \qquad (7)$$

Hence, if object o is contained in i+1 cache nodes, then an expected cache array processing time to satisfy a request for object o may be given by:

$$\text{hit\_time}(i+1)=c*(i+1)/n+d*(n-(i+1))/n \qquad (8)$$

Expected savings in cache array processing time resulting from copying object o to an additional cache node may thus be given by:

$$\text{savings}(i+1) = \text{hit\_time}(i) - \text{hit\_time}(i+1) \quad (9)$$

Further, the desirability of copying object o to an additional cache node may be proportional to an expected number of hits to object o per unit time (assuming it is cached) multiplied by a measure of savings (resulting from a storing a new copy of object o) and divided by the size of object o. An exemplary function for estimating the desirability of caching a new copy of object o may be given by:

$$d2(o, i+1) = (1/a - p/u) * \text{savings}(i+1)/s \quad (10)$$

Other functions may also be used for estimating the desirability of caching a new copy of object o.

Alternatively, suppose that bottlenecks are caused in the system due to a network or networks connecting a cache array and one or more servers. The desirability of caching one copy of object o may proportional to an expected number of hits to object o per unit time (assuming it is cached). An exemplary function for estimating the desirability of caching one copy of object o may be given by:

$$d3(o, 1) = 1/a - p/u \quad (11)$$

Other functions may also be used for estimating the desirability of caching object o.

If at least one copy of object o is already cached, no additional network bandwidth may be saved by caching additional copies of object o. Therefore, the desirability for caching any additional copies of object o, in this case, may be given by:

$$d3(o, i) = 0, \forall i > 1 \quad (12)$$

In step 230 the desirability of caching an object may be calculated by assigning to objects desirability values. The desirability values may be assigned to objects based on metrics such as the functions given above. For example, if the performance criterion selected is to minimize the use of server resources, functions (1) and (2) may be used as metrics. If the performance criterion selected is to minimize the use of cache array resources, functions (6) and (10) may be used as metrics. If the performance criterion selected is to minimize the use of network resources, functions (11) and (12) may be used as metrics. In other words, a desirability value for a particular object may be calculated by substituting appropriate values for the variables of the metrics. Note that the notation $dj(o, i)$, $j \in \{1,2,3\}$, indicates an evaluation of a metrics $dj(.,.)$ giving a desirability value for the $i^{th}$ copy of object o.

Desirability values for objects may be stored in data structures. For example, data structures ds1, ds2, and ds3 may be maintained to store desirability values based on functions d1, d2, and d3, respectively. Data structures ds1, ds2, and ds3 may be constructed, for example, as set forth in U.S. patent application Ser. No. 08/958,506 titled "A New Algorithm for Cache Replacement".

In step 240 a duplication and/or replacement of objects policy may be applied based on the desirability values calculated in step 230. Optionally, once a duplication and/or replacement policy is applied, the process may restart at step 210, 220, or 230. A duplication and/or replacement of objects policy may be implemented to help improve the performance of a system, such as system 100 of FIG. 1(a). For example, duplication and/or replacement policies may be implemented to help minimize the use of system resources. In particular, duplication and/or replacement of objects policies may be implemented to help minimize the use of bottlenecked system resources.

The performance of a server (or servers), of a cache array, and of a network of a system may be periodically monitored. Periodic monitoring may be performed to determine which, if any, of the system's resources are becoming bottlenecks. Once a system resource is determined to be a bottleneck the following exemplary duplication and/or replacement policies may be applied.

An exemplary policy which may minimize the use of server resources by duplication and/or replacement of objects may be described as follows:

(i) replacing a copy of a cached object corresponding to the lowest (estimated) d1(.,.) value; but (ii) not performing any duplication of an object which may force an only copy of any cached object to be removed from a cache array.

Figure 3:
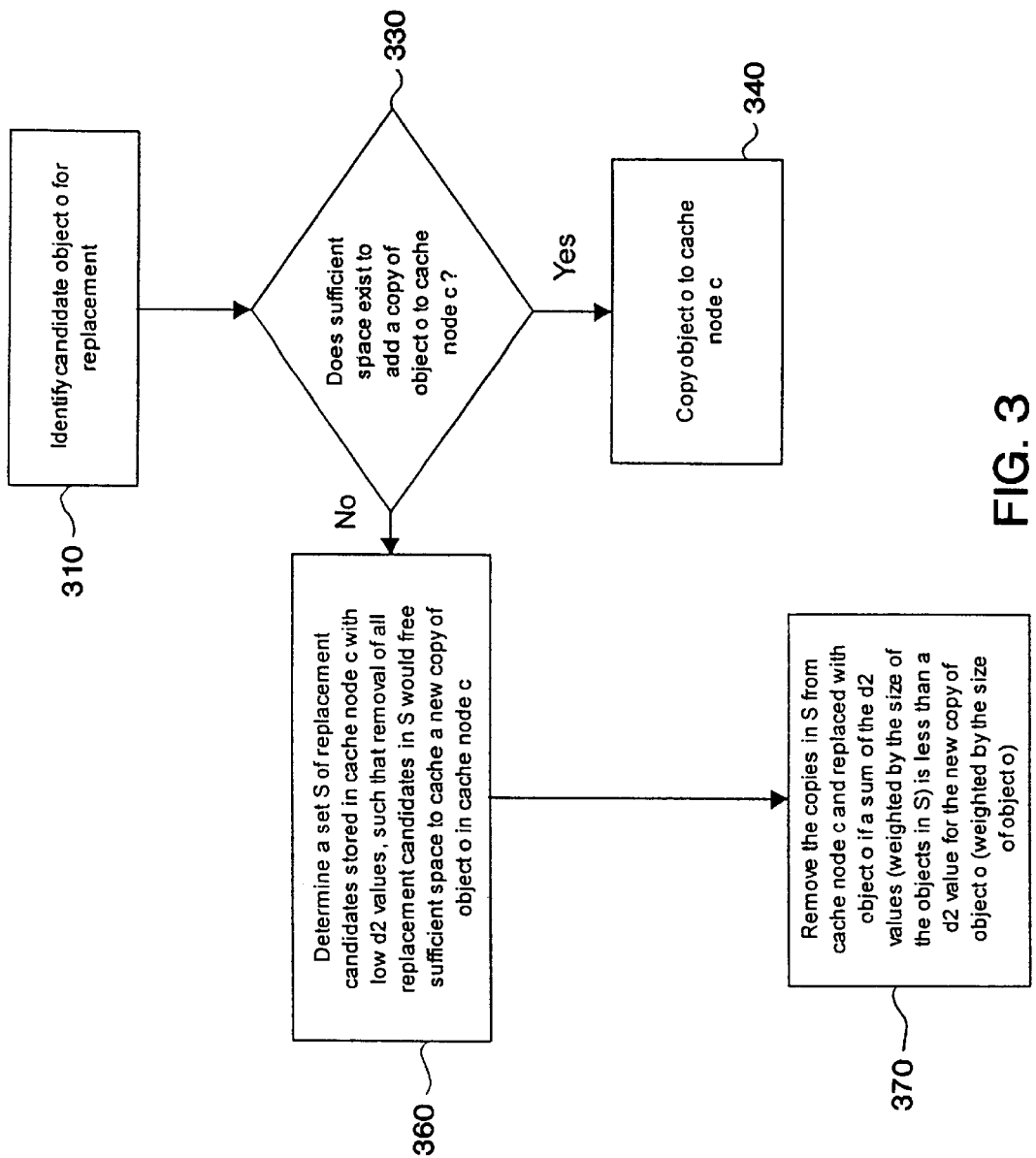
FIG. 3 is a flowchart diagram illustrating a replacement policy which may minimize the use of cache array resources in accordance with an exemplary embodiment of the present invention.

FIG. 3 is a flowchart illustrating an exemplary replacement policy which may minimize the use of cache array resources. In step 310 an object o may be identified. Object o identified, in step 310, may not be contained in a cache node c, but is a candidate for addition to cache node c. In step 330 a determination may be made as to whether sufficient space exists to add a copy of object o to cache node c. If sufficient space exists in cache node c, then in step 340 a copy of object o may be stored in cache node c. If sufficient space does not exist to add a copy of object o to a cache node c, then in step 360 a set S of replacement candidates (already stored in is cache node c) may be found. A set S of replacement candidates may be determined such that removal of the object or objects belonging to set S from cache node c, would free sufficient space to cache a new copy of object o in cache node c. In step 370 an object or all objects belonging to set S may be removed from cache node c and replaced with a new copy of object o if, for example, a sum of the d2(.,.) values (weighted by the size of the objects in S) is less than a d2(.,.) value for the new copy of object o (weighted by the size of object o).

An exemplary replacement policy which may minimize the use of server resources is given by FIG. 3 if metric d2(.,.) is replaced by metric d1(.,.). Further, an exemplary replacement policy which may minimize the use of network resources is given by FIG. 3 if metric d2(.,.) is replaced by metric d3(.,.).

An exemplary policy which may minimize the use of cache array resources by duplication and/or replacement of objects may be described as follows:

(i) replacing a copy of an object corresponding to the lowest (estimated) d2(.,.) value; and (ii) duplicating objects in some of the cache nodes as follows (ii.1) Let o be an object with the largest d2(., 1) value which is not contained in any of the cache nodes (i.e. object o is "hot" and is not contained in the cache array).

(iii.1) Copy object o to any cache nodes not already containing a copy of object o, provided sufficient space exists.

(iv.1) Let c be a cache node not containing a copy of object o, for which insufficient space exists to store a new copy of object o. Let S be a set of replacement candidates stored in cache node c with low d2(.,.) values, such that removal of all replacement candidates in S would free sufficient space to cache a new copy of object o in cache node c.

(v) Remove the copies in S from cache node c and replaced with object o if and only if a sum of the d2(.,.) values (weighted by the size of the objects in S) is less than a d2(.,.) value for the new copy of object o (weighted by the size of object o).

Figure 4:
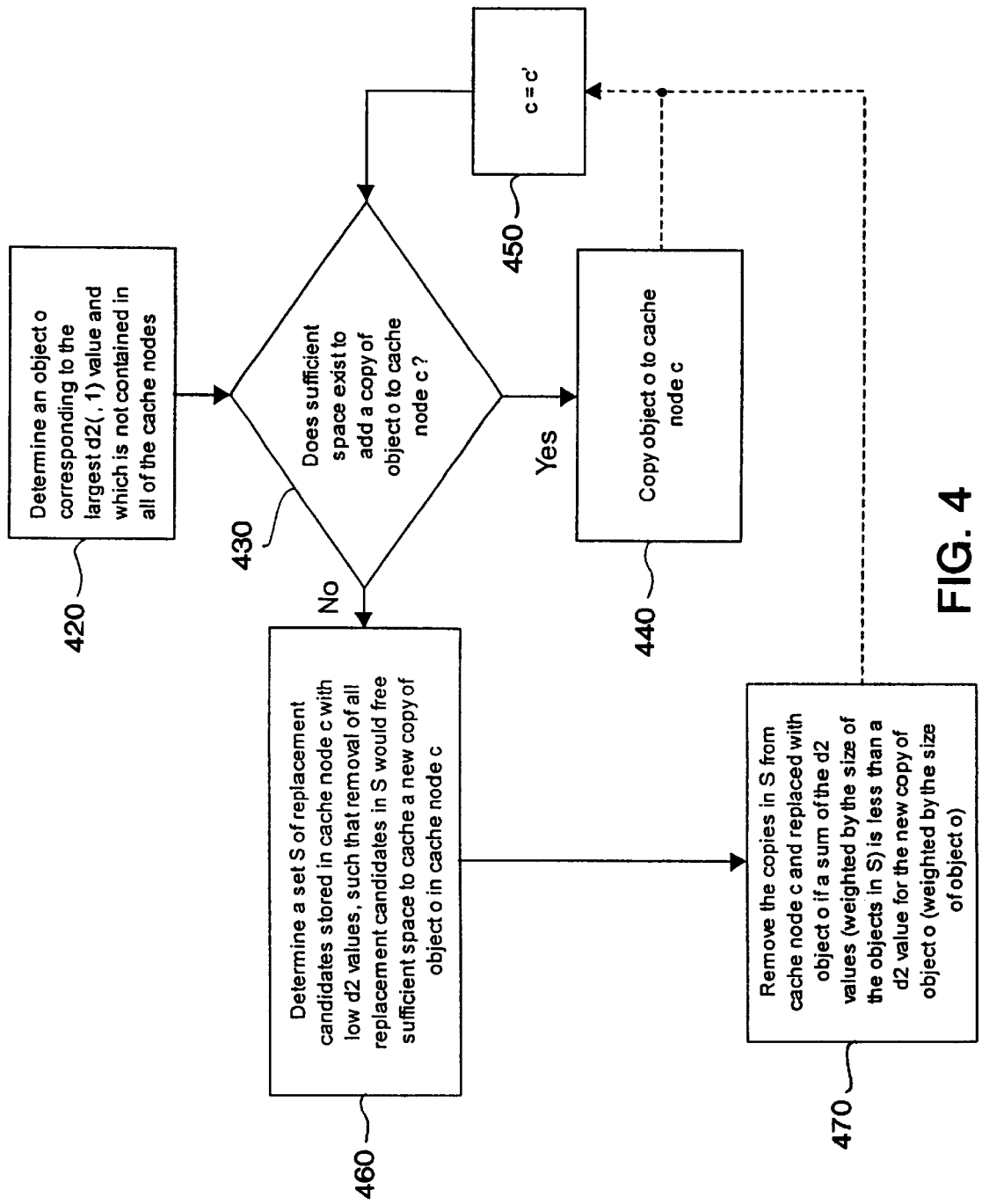
FIG. 4 is a flowchart diagram illustrating a duplication policy which may minimize the use of cache array resources in accordance with an exemplary embodiment of the present invention.

FIG. 4 is a flowchart illustrating an exemplary duplication policy which may minimize the use of cache array resources. In step 420 an object o corresponding to the largest d2(.,1) value, where object o is not contained in all of the cache nodes may be found. In step 430 a determination may be made as to whether sufficient space exists to add a copy of object o to a cache node c. If sufficient space exists in cache node c, then in step 440 a copy of object o may be stored in cache c. In step 450 cache node c may optionally be set to another cache node c'. The process may then be repeated for cache node c'. If sufficient space does not exist to add a copy of object o to a cache node c, then in step 460 a set S of replacement candidates (already stored in cache node c) may be found. A set S of replacement candidates may be determined such that removal of the object or objects belonging to set S from cache node c, would free sufficient space to cache a new copy of object o in cache node c. In step 470 an object or all objects belonging to set S may be removed from cache node c and replaced with a new copy of object o if, for example, a sum of the d2(.,.) values (weighted by the size of the objects in S) is less than a d2(.,.) value for the new copy of object o (weighted by the size of object o). In step 450 cache node c may optionally be set to another cache node c'. The process may then be repeated for cache node c'. Note that the replacement policy illustrated in FIG. 3 may be combined with the duplication policy of FIG. 4 to further reduce the use of cache array resources.

A system such as system 100 of FIG. 1(*a*) may be adapted to operate according to a duplication and/or replacement of objects policy, such as, for example, the policies explained above. In addition, system 100 may be designed such that: a given percentage of objects are replaced using a policy based on a metric such as metric d1(.,.); a given percentage of objects are replaced using a policy based on a metric such as metric d2(.,.); and a given percentage of objects are replaced using a policy based on a metric such as metric d3(.,.). Moreover, duplication may optionally be performed to reduce cache member misses. The percentage of objects replaced based on each of metrics d1(.,.), d2(.,.), and d3(.,.), respectively, may be adjusted based on monitored system performance and/or based on an expectation of which system resources may become bottlenecks.

Suppose some but not necessarily all of cache nodes become bottlenecks of a system, some pages contained in overloaded cache nodes may be moved to and/or duplicated on less loaded caches. Thus, the demand for system resources may be more evenly shared by the cache nodes. If some but not necessarily all servers become bottlenecks of a system, more requests may be directed to relatively lightly loaded servers. When directing requests to relatively lightly loaded servers it may be desirable to move some objects from one server to another.

In general, whenever servers, cache nodes, or a network or networks become overloaded (bottlenecked) it may be desirable to implement techniques for improving system performance. If no action is taken to remove system bottlenecks, the system may become relatively slow or unusable.

Figure 5:
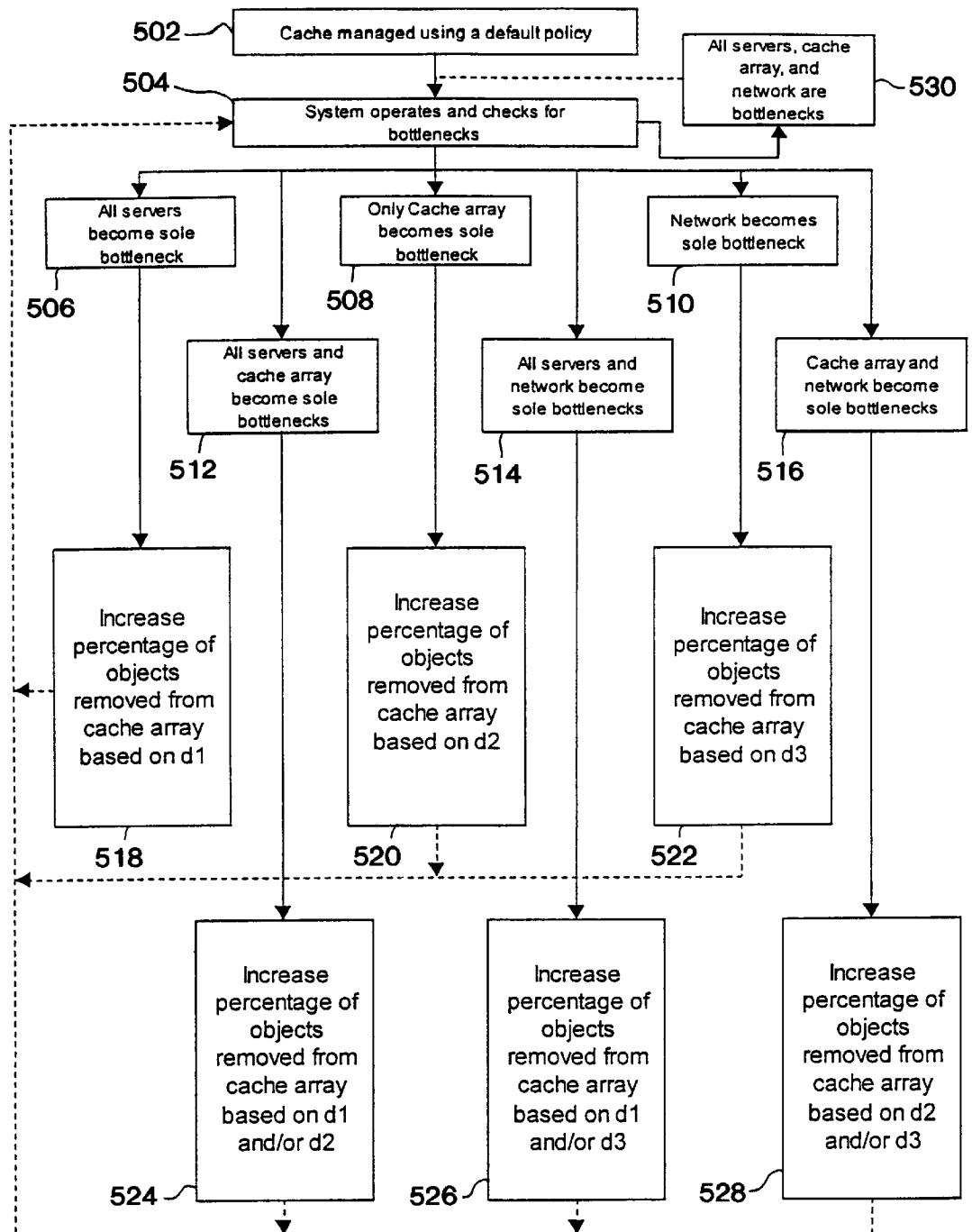
FIG. 5 is a flowchart diagram illustrating techniques for improving system performance by dynamically varying cache replacement/duplication/routing policies in accordance with an exemplary embodiment of the present invention.

The following are techniques which may used to improve performance in a system (e.g. system 100 of FIG. 1(*a*)) in accordance with an exemplary embodiment of the present invention. An exemplary flowchart illustrating such techniques for improving system performance by dynamically varying cache replacement and/or duplication policies is shown in FIG. 5. In step 502, a cache array replacement and/or duplication policy is initialized to a default policy. A default policy may be, for example, to replace and/or duplicate a given percentage (e.g. 33.3%) of objects based on desirability values corresponding to the d1(.,.) metric, a given percentage (e.g. 33.3%) of objects based on desirability values corresponding to the d2(.,.) metric, and a given percentage (e.g. 33.3%) of objects based on desirability values corresponding to the d3(.,.) metric. In step 504, while a system (e.g. system 100 of FIG. 1(*a*)) operates, the system may concurrently check for bottlenecks that impede system performance.

Case 1: All Servers are Bottleneck

If, while a system operates, in step 506, a system determines that all servers have become (or are predicted to become) bottlenecks, then in step 518 a percentage of objects which are removed from the cache based on desirability values corresponding to the d1(.,.) metric may be increased by:

(i) decreasing a percentage of objects replaced in cache nodes based on desirability values corresponding to the d2(.,.) metric; and/or (ii) decreasing a percentage of objects replaced based on desirability values corresponding to the d3(.,.) metric.

In addition, in step 518, when and if a cache array has insufficient space to contain a desired number of copies of objects, objects for which multiple copies are cached may be removed before removing objects for which a single copy is cached. Moreover, copies assigned the lowest desirability values corresponding to the d2(.,.) metric may be removed first.

In step 518 it may also be desirable to decrease the portion of requests from a network dispatcher which bypass a cache array. For example, when a cache array is not a bottleneck, it may be desirable to decrease a given percentage of requests which a network dispatcher routes to a server or servers by bypassing the cache array.

Case 2: Cache Array is the Bottleneck

If, while a system operates, in step 508, a system determines a cache array has become (or is predicted to become) a bottleneck, then in step 520 the percentage of objects which are removed from a cache array based on desirability values corresponding to the metric d2(.,.) values may be increased. Further, duplication and/or replacement of cached objects may be performed to help decrease cache member misses. For example, an object o which is not contained in all cache nodes, and with the highest desirability value d2(o,1) may be selected to be duplicated. Duplication and/or replacement of objects may continue until the caching a new copy of an object may necessitate removal of a set of replacement candidates such that, for example, a sum of desirability values (based on the metric d2(.,.)) weighted by the sizes of the replacement candidates is less than a desirability value (based on the metric d2(.,.)) assigned to the new copy weighted by the size of the new copy.

In step 520 it may also be desirable to increase the portion of requests from a network dispatcher which bypass a cache array. For example, if a cache array is a bottleneck, it may be desirable to increase a given percentage of requests which a network dispatcher routes to a server or servers by bypassing the cache array.

Case 3: Network is a Bottleneck

If, while a system operates, in step 510, a system determines a network has become (or is predicted to become) a bottleneck, then in step 522 a percentage of objects which are removed from the cache based on desirability values corresponding to the d3(.,.) metric may be increased by:
  (i) decreasing a percentage of objects replaced in cache nodes based on desirability values corresponding to the d2(.,.) metric; and/or
  (ii) decreasing a percentage of objects replaced based on desirability values corresponding to the d1(.,.) metric.

In addition, in step 522, when and if a cache array has insufficient space to contain a desired number of copies of objects, objects for which multiple copies are cached may be removed before removing objects for which a single copy is cached. Moreover, copies assigned the lowest desirability values corresponding to the d2(.,.) metric may be removed first.

In step 522 it may also be desirable to decrease the portion of requests from a network dispatcher which bypass a cache array. For example, when a cache array is not a bottleneck, it may be desirable to decrease a given percentage of requests which a network dispatcher routes to a server or servers by bypassing the cache array.

Case 4: All Servers and Cache Array are Bottlenecks

If, while a system operates, in step 512, a system determines that all servers and a cache array have become (or are predicted to become) bottlenecks, then in step 524 it may be desirable to increase a percentage of objects which are removed from the cache based on desirability values corresponding to the metrics d1(.,.) and/or d2(.,.).

If a cache array has sufficient space (i.e. is not full), duplication and/or replacement of objects in the cache array may be desirable. Duplication of cached objects, in step 524, may help decrease cache node misses. For example, any object which is not contained in all cache nodes and with the highest desirability value calculated based on the function d2(.,1) may be duplicated. It is desirable, however, not to remove objects for which only a single copy is cached.

Case 5: All Servers and Network are Bottlenecks

If, while a system operates, in step 514, a system determines that all servers and a network have become (or are predicted to become) bottlenecks, then in step 526 it may be desirable to increase a percentage of objects which are removed from the cache based on desirability values corresponding to the metrics d1(.,.) and/or d3(.,.).

In addition, in step 526, when and if a cache array has insufficient space to contain a desired number of copies of objects, objects for which multiple copies are cached may be removed before removing objects for which a single copy is cached. Moreover, copies assigned the lowest desirability values corresponding to the d2(.,.) metric may be removed first.

In step 526 it may also be desirable to decrease the portion of requests from a network dispatcher which bypass a cache array. For example, when a cache array is not a bottleneck, it may be desirable to decrease a given percentage of requests which a network dispatcher routes to a server or servers by bypassing the cache array.

Case 6: Cache Array and Network are Bottlenecks

If, while a system operates, in step 516a, a system determines a cache array and a network have become (or are predicted to become) bottlenecks, then in step 528 it may be desirable to increase a percentage of objects which are removed from the cache based on desirability values corresponding to the metrics d2(.,.) and/or d3(.,.).

If a cache array has sufficient space (i.e. is not full), duplication and/or replacement of objects in the cache array may be desirable. Duplication of cached object, in step 528, may help decrease cache node misses. For example, any object which is not contained in all cache nodes and with the highest desirability value calculated based on the finction d2(.,1) may be duplicated. It is desirable, however, not to remove objects for which only a single copy is cached.

Case 7: All Server, Cache Array, and Network are Bottlenecks

If, while a system operates, in step 530a, a system determines all servers, a cache array, and a network have become bottlenecks, then, it may not be desirable to change a replacement and/or duplication policy.

One of ordinary skill in the art may conceive of adaptations of the above exemplary embodiments. For example, in some of the above exemplary embodiments priority may be given to the removal of cached objects with a relatively low (estimated) desirability value corresponding to a metric such as, for example, metric d2(.,.). In some instances, however, it may be advantageous to give priority to the removal of relatively large cached objects. Alternatively, another metric may be chosen for weighing considerations of both object size and a metric such as metric d2(.,.) for determining which cached object to remove.

Furthermore, in some instances, it may be desirable to maintain at least two copies of an object in a cache array (or in a cache node). Maintaining at least two copies of an object may be advantageous even if little or no improvement results in steady-state system performance. A second copy of an object may increase the availability of an object. For example, if one cache node containing an object fails, a second copy of the object may still be available for retrieval from another cache node. In order to maintain two copies of an object o in a cache array, the desirability values assigned to object o using, for example, d1(o, 2), d2(o, 2), and/or d3(o,2) may be increased.

Content-Based Routing

Figure 6:
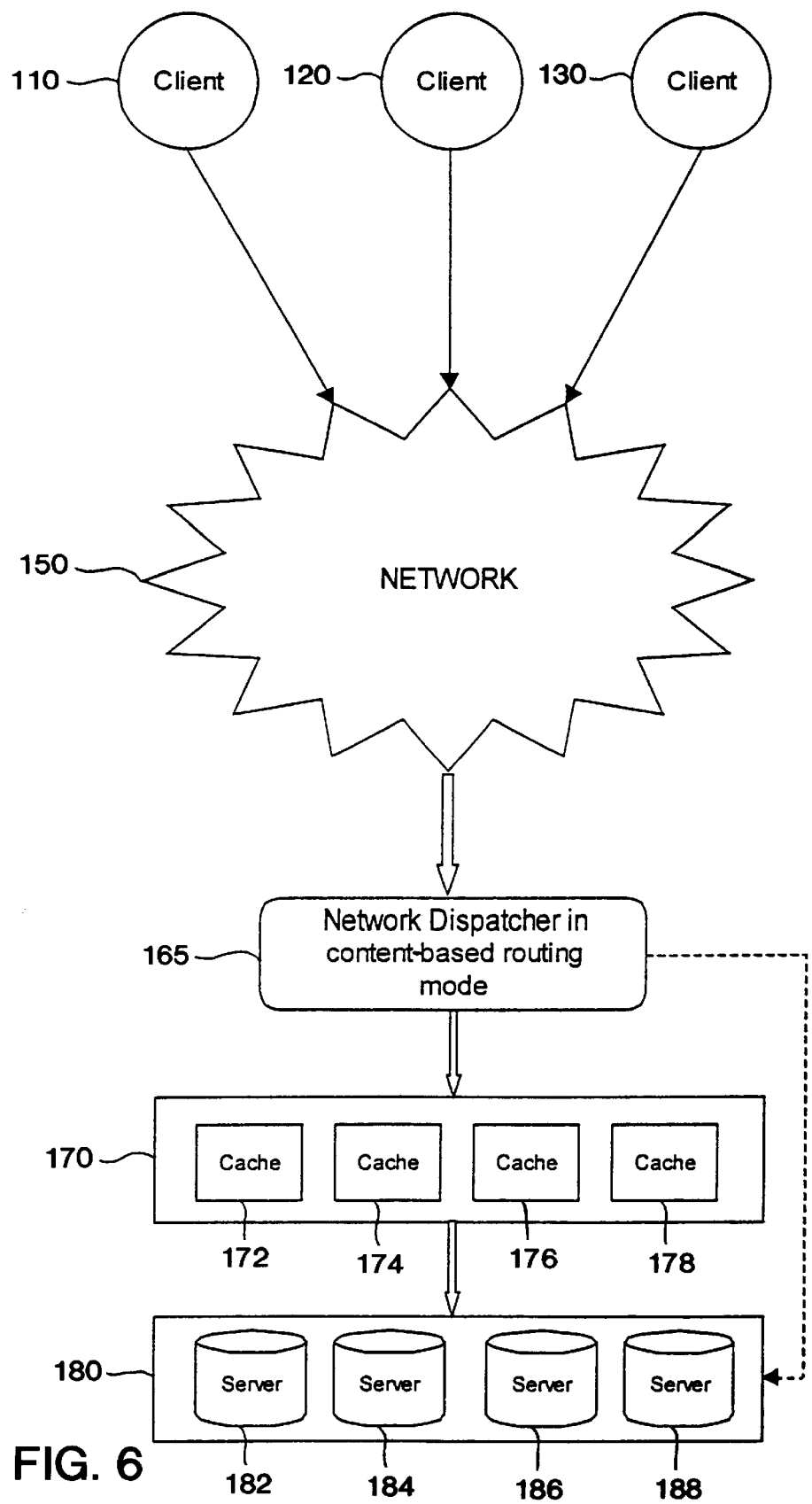
FIG. 6 is a block diagram which illustrates a method for retrieving a requested object in the case of content based routing in accordance with an exemplary embodiment of the present invention.

In this case, network dispatcher 160 of FIG. 1(*a*), may function as content-based router 165 of FIG. 6. In particular, a network dispatcher such as, for example, network dispatcher 160 of FIG. 1(*a*) operating in a special mode, may function as content-based router 165. Addresses for requested objects (e.g. URLs) may be partitioned amongst cache nodes 172, 174, 176, and 178 of cache array 170 using, for example, a hashing function. In other words, a hashing function may be used to form a correspondence between cache nodes and requested objects. The address of a requested object may be hashed. The output of the hashing function may be a cache node associated with one or more servers which may generate or fetch a requested object or on which a requested object is stored. In other words, the output of the hashing function may be a cache member that is the primary owner of a requested object. This is not necessarily to imply that there is a special relationship between a cache node and a server. Although, optionally, one such relationship may exist.

When a client, such as clients 110, 120, and 130, requests the retrieval of an object, content-based router 165 may perform a handoff of the request along with, for example, TCP connection information, to a cache node selected by content-based router 165. The cache node selected by content-based router 165 is the primary owner of the requested object. The selected cache node may then retrieve the requested object either from cache memory or from a server with which it is associated, and transmit the requested object to a requesting client via network 150.

As a network dispatcher, operating in a special mode, may function as a content-based router, it is possible for a network dispatcher to route requests using a combination of content-based and non-content-based routing. When content-based routing is used, network dispatcher 160 operating as content-based router 165 may examine a request sent by a client to determine which cache node is a primary owner of a requested object. As content-based routing avoids cache member misses, content-based routing may reduce processor cycles spent by the cache array. Content-based routing, however, may increase consumption of processor cycles by network dispatcher 160 operating as content-based router 165. More processor cycles may be consumed by network dispatcher 160 operating in content-based routing mode because network dispatcher 160 establishes a connection with a client.

It may be advantageous to use content-based router 165, as long as it does not become a system bottleneck. For example, a content-based router implemented by an IBM 2216 router may not become a bottleneck as long as fewer than 10K requests/sec are made. If, however, more than 10K requests/sec are made (statically or dynamically) then it may be advantageous for an IBM 2216 router to act as a network dispatcher. Alternatively, a content-based router having an integrated cache may be used. At relatively low and intermediate system loads, a content-based router may serve requests using an integrated cache. At relatively high system loads such a router may resume the functionality of a network dispatcher.

For example, an IBM 2216 router is capable of routing approximately 15,000 requests per second as a network dispatcher. An IBM 2216 router acting as a cache node is capable of serving approximately 5,000 objects per second at nearly 100% cache rate. An IBM 2216 router acting as a content-based router with handoff is able to serve approximately 5,000/0.5=10,000 requests a second.

In a variation of the above exemplary embodiments of the present invention illustrated, for example, in FIG. 5, a percentage of requests routed by network dispatcher 160 to cache array 170 may be performed in content-based routing mode. Content-based routing may incur less overhead on cache array 170 but more overhead at network dispatcher 160. The percentage of requests for which content-based routing is used may be selected to balance utilization of network dispatcher and cache array resources. For example, routing a percentage of requests in content-based routing mode may be used to reduce the likelihood of a cache array becoming a bottleneck.

A further variation may be to increase a percentage of requests which are routed using content-based routing mode in response to cache array 170 becoming a bottleneck. In response to network dispatcher 160 becoming a bottleneck, however, the percentage of requests which are routed using content-based routing mode may be decreased.

Duplication may not lead to performance improvements for requests which are routed in content-based mode. Therefore, desirability values calculated based on metric d2(.,.) for additional copies of an object o (i.e. for d2(o, i) for i>1), may be decreased if content-based routing is used. For example, desirability values calculated based on metric d2(.,.) for additional copies of an object may be multiplied by a proportion of requests which are not routed in content-based mode.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. In a system adapted to receive requests for objects from one or more clients, the system having at least one of a plurality of nodes, each node including at least one of a plurality of caches, a method for replacing any one of said objects stored in said at least one of the plurality of caches comprising the steps of:

selecting more than one performance criterion of the system from a plurality of performance criteria;

assigning at least one of a plurality of metrics to said more than one performance criterion;

calculating the desirability of storing an object of said objects in any one of the plurality of caches by calculating at least one of a plurality of desirability values for at least one of said objects based on said at least one of the plurality of metrics; and replacing said any one of said objects stored in said at least one of the plurality of caches based on said at least one of the plurality of desirability values.

2. The method of claim 1, wherein a metric of the plurality of metrics is correlated with an amount by which storing a copy of one of the plurality of objects in a cache of the plurality of caches reduces utilization of a resource of the system.

3. The method of claim 2, wherein the resource of the system includes processing capacity of a node of the plurality of nodes.

4. The method of claim 2, wherein the plurality of nodes includes at least one of a plurality of level one nodes which is coupled to at least one of a plurality of level two nodes, and wherein the resource of the system includes processing capacity of any one of said level two nodes.

5. The method of claim 2, wherein the plurality of nodes includes at least one of a plurality of level one nodes which is coupled to at least one of a plurality of level two nodes via a network, and wherein the resource of the system includes the network.

6. The method of claim 4, wherein a desirability value of the plurality of desirability values for the copy of one of the plurality of objects is correlated with an expected number of hits to the object per unit time multiplied by an expected processing time on said any one of the plurality of level two nodes to fetch or calculate the object divided by a size of the object.

7. The method of claim 6, wherein the desirability value for the copy of one of the plurality of objects is correlated with the quantity $(t/a - t*p/u)/s$, a being an expected time between successive requests for the object, t being the expected processing time for said any one of the plurality of level two nodes to fetch or calculate the object, u being an expected time between successive updates of the object, p being a probability that the object will be accessed between successive updates to the object, and s being the size of the object.

8. The method of claim 5, wherein a desirability value of a plurality of desirability values for the copy of one of the plurality of objects is correlated with an expected number of hits to the object per unit time if the object is cached.

9. The method of claim 8, wherein the desirability value for the copy of one of the plurality of objects is correlated with the quantity $1/a - p/u$, a being an expected time between successive requests for the object, u being an expected time between successive updates of the object, and p being a probability that the object will be accessed between successive updates to the object.

10. The method of claim 1, further comprising the step of varying a frequency with which said more than one performance criterion are selected.

11. The method of claim 2, further comprising the steps of:
   (i) determining the resource of the system causing a bottleneck; and
   (ii) varying in response to the determination of step (i) a frequency with which said more than one performance criterion are selected.

12. The method of claim 11, wherein step (ii) includes increasing the frequency of selection of said more than one performance criterion corresponding to the metric correlated with the amount by which storing the copy of one of the plurality of objects in the cache of the plurality of caches reduces utilization of the resource of the system causing the bottleneck.

13. The method of claim 12, wherein the plurality of nodes includes at least one of a plurality of level one nodes which is coupled to at least one of a plurality of level two nodes via a network, and wherein the resource of the system causing the bottleneck is associated with at least one of processing power of any one of the plurality of level one nodes, processing power of at any one of the plurality of level two nodes, and a bandwidth of the network.

14. The method of claim 1, the plurality of nodes includes at least one of a plurality of level one nodes which is coupled to at least one of a plurality of level two nodes, said method further comprising the step of:
   (i) determining a level one node to be a bottleneck in the system; and
   (ii) transmitting in response to the determination of step (i) one or more requests to any one of the plurality of level two nodes without first attempting to satisfy said one or more requests from a cache of the level one node.

15. The method of claim 1, wherein the plurality of nodes includes at least one of a plurality of level one nodes which is coupled to at least one of a plurality of level two nodes via a network, the method further comprising the steps of:
   (i) determining at least one of a portion of the network and any one of the plurality of level two nodes to be a bottleneck in the system; and
   (ii) reducing in response to the determination of step (i) a number of requests sent to said any one of the plurality of level two nodes without first attempting to satisfy the request from a cache on a level one node of the plurality of level one nodes.

16. A method for caching objects in a system adapted to receive requests for said objects from one or more clients, the system having at least one of a plurality of nodes, each node of the plurality of nodes including at least one of a plurality of caches, said method comprising the steps of:
   (a) selecting more than one performance criterion of the system from a plurality of performance criteria;
   (b) assigning at least one of a plurality of metrics to said more than one performance criterion;
   (c) calculating the desirability of storing an object of said objects in any one of the plurality of caches by calculating at least one of a plurality of desirability values for at least one of said objects based on said at least one of the plurality of metrics; and
   (d) duplicating any one of said objects stored in said at least one of the plurality of caches based on said at least one of the plurality of desirability values.

17. The method of claim 16, wherein the plurality of nodes includes at least one of a plurality of level one nodes and a request of said requests is transmitted to a level one node of the plurality of level one nodes which does not contain a requested object of said objects, and the requested object is contained in a cache of the plurality of caches.

18. The method of claim 17, wherein said more than one performance criterion includes reduction of a frequency of cache member misses.

19. The method of claim 17, wherein said more than one performance criterion includes reduction of cache node misses due to a cache failure.

20. The method of claim 17, wherein step (c) further includes calculating the desirability of storing the object of said objects in said any one of the plurality of caches based on an amount by which storing the object in said any one of the plurality of caches reduces utilization of resources of any one of the plurality of level one nodes.

21. The method of claim 20, wherein a desirability value $d2(o,i+1)$ of the plurality of desirability values for duplicating object o and storing an $(i+1)^{th}$ copy of object o in said any of the plurality of caches is given by $$d2(o,i+1)=(1/a-p/u)*\text{savings}(i+1)/s,$$

a being an expected time between successive requests for object o, p being a probability that object o may be accessed between successive updates to object o, u being an expected time between successive updates of object o, s being the size of object o, and savings(i+1) being an expected savings in cache processing time resulting from copying object o to an additional cache node.

22. The method of claim 21, wherein
   savings(1) is correlated with miss_time–hit_time(1),
   miss_time being an expected cache array processing time to satisfy a request for object o in case of a cache array miss, and hit_time(1) being an expected cache array processing time to satisfy a request for object o in case of a cache array hit.

23. The method of claim 21, wherein
   savings(i) is correlated with hit_time(i)–hit_time(i+1), for i>1,
   miss_time being an expected cache array processing time to satisfy a request for object o in case of a cache array miss, and hit_time(i+1) being an expected cache array processing time to satisfy a request for object o in case of a cache array hit.

24. The method of claim 20, further comprising the step of increasing the desirability of storing the object to be greater than the amount by which storing the object in said any one of the plurality of caches reduces utilization of resources of any one of the plurality of level one nodes to improve system performance in case of failure of the cache containing the requested object.

25. The method of claim 17, further comprising the step of
   in response to said any one of the plurality of caches containing insufficient space for a new copy of the object:
   (i) determining at least one of a plurality of replacement candidates of said objects, wherein removal of said at least one of the plurality of replacement candidates from said any one of the plurality of caches provides sufficient space to store the new copy of the object; and
   (ii) removing said at least one of the plurality of replacement candidates from said any one of the plurality of caches and adding the new copy to said any one of the plurality of caches in response to a sum of said at least one of the plurality of desirability values assigned to said at least one of the plurality of replacement candidates weighted by the size of said at least one of the plurality of replacement candidates being less than a desirability of the new copy weighted by the size of the new copy.

26. The method of claim 1, wherein the plurality of metrics includes a location of the object in a data structure.

27. The method of claim 26, wherein the location of the object in the data structure is a position of the object in a linked list.

* * * * *